United States Patent
Heinmiller et al.

(10) Patent No.: US 9,237,176 B2
(45) Date of Patent: *Jan. 12, 2016

(54) METHOD AND DEVICE FOR TRANSMITTING AUDIO AND VIDEO FOR PLAYBACK

(71) Applicant: AT&T Intellectual Property I, LP, Atlanta, GA (US)

(72) Inventors: Wayne R. Heinmiller, Elgin, IL (US); Carol S. Gruchala, Naperville, IL (US); Dianna Tiliks, Palatine, IL (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/245,407

(22) Filed: Apr. 4, 2014

(65) Prior Publication Data

US 2014/0223025 A1 Aug. 7, 2014

Related U.S. Application Data

(63) Continuation of application No. 12/352,019, filed on Jan. 12, 2009, now Pat. No. 8,731,370.

(51) Int. Cl.
| | |
|---|---|
| *H04N 5/92* | (2006.01) |
| *H04L 29/06* | (2006.01) |
| *G11B 27/10* | (2006.01) |
| *H04N 5/60* | (2006.01) |
| *H04N 21/2343* | (2011.01) |
| *H04N 21/43* | (2011.01) |
| *H04N 21/434* | (2011.01) |
| *H04N 21/462* | (2011.01) |

(Continued)

(52) U.S. Cl.
CPC ............... *H04L 65/60* (2013.01); *G11B 27/10* (2013.01); *H04N 5/602* (2013.01); *H04N 21/234318* (2013.01); *H04N 21/434* (2013.01); *H04N 21/4307* (2013.01); *H04N 21/4341* (2013.01); *H04N 21/4622* (2013.01); *H04N 21/485* (2013.01); *H04N 21/631* (2013.01); *H04N 21/816* (2013.01); *H04N 21/8106* (2013.01)

(58) Field of Classification Search
CPC  H04N 21/631; H04N 21/816; H04N 21/8106
USPC ......................................... 386/203.239, 248
See application file for complete search history.

(56) References Cited

U.S. PATENT DOCUMENTS

| 5,570,296 A | 10/1996 | Heyl |
| 6,674,457 B1 | 1/2004 | Davies |

(Continued)

*Primary Examiner* — William Tran
(74) *Attorney, Agent, or Firm* — Guntin & Gust, PLC; Ralph Trementozzi

(57) ABSTRACT

A system that incorporates teachings of the subject disclosure may include, for example, selecting a first multimedia stream including a first video stream and selecting a second audio stream associated with common subject matter. A timing offset is determined according to a time difference between a first input coincident with a visual aspect of an event observable in playback of the first video stream and a second input coincident with an audible aspect of the event observable in playback of the second audio stream. One of the first input, the second input, or the first and second inputs comprises performing an action during playback of the first video stream and the second audio stream at a multimedia center. The first video stream and the second audio stream are synchronized in in real-time according to the timing offset. Other embodiments are disclosed.

20 Claims, 6 Drawing Sheets

(51) Int. Cl.
*H04N 21/485* (2011.01)
*H04N 21/63* (2011.01)
*H04N 21/81* (2011.01)

(56) References Cited

U.S. PATENT DOCUMENTS

| | | |
|---|---|---|
| 6,956,871 B2 | 10/2005 | Wang |
| 7,142,250 B1 | 11/2006 | Black |
| 7,170,545 B2 | 1/2007 | Rodman |
| 7,283,175 B2 | 10/2007 | Johnson |
| 7,295,548 B2 | 11/2007 | Blank |
| 7,337,403 B2 | 2/2008 | Pavley |
| 7,386,782 B2 | 6/2008 | Comps |
| 7,401,104 B2 | 7/2008 | Shah |
| 7,405,996 B2 | 7/2008 | Minzoni |
| 2002/0196462 A1 | 12/2002 | Kosaka |
| 2005/0012860 A1* | 1/2005 | Cooper ............... H04N 5/073 348/515 |
| 2005/0042591 A1 | 2/2005 | Bloom |
| 2005/0160465 A1 | 7/2005 | Walker |
| 2006/0078305 A1* | 4/2006 | Arora .................. G11B 27/10 386/201 |
| 2006/0259862 A1 | 11/2006 | Adams et al. |
| 2006/0290810 A1 | 12/2006 | Mallinson |
| 2007/0019931 A1 | 1/2007 | Sirbu |
| 2007/0118852 A1 | 5/2007 | Calderwood |
| 2008/0181260 A1 | 7/2008 | Vonog |
| 2008/0219641 A1 | 9/2008 | Sandrew |
| 2008/0320545 A1* | 12/2008 | Schwartz ........... H04N 7/17318 725/135 |
| 2009/0271524 A1* | 10/2009 | Davi ............... H04N 21/234336 709/231 |
| 2010/0042682 A1 | 2/2010 | Kaye |

* cited by examiner

METHOD AND DEVICE FOR TRANSMITTING AUDIO AND VIDEO FOR PLAYBACK

CROSS-REFERENCE TO RELATED APPLICATION(S)

This application is a continuation of U.S. patent application Ser. No. 12/352,019 filed Jan. 12, 2009 by Heinmiller et al., entitled "Method and Device for Transmitting Audio and Video for Playback." All sections of the aforementioned application(s) are incorporated herein by reference in its entirety.

FIELD OF THE DISCLOSURE

The present disclosure generally relates to the playback of audio and video streams and more particularly relates to synchronization of audio and video streams.

BACKGROUND

Multimedia streams include both a video stream and an audio stream. Synchronization between a multimedia stream's video stream and audio stream is accomplished either inherently or explicitly. Inherent synchronization is accomplished by ensuring the video stream and the audio stream are received at a multimedia processing device with appropriate timing to facilitate synchronized audio and video playback after processing by the multimedia processing device. Alternatively, explicit synchronization is accomplished by incorporating audio and video time stamps into respective audio and video streams to correlate common content portions of the video stream, e.g., pictures, and the audio stream. However, when the audio stream and video stream are generated from different sources neither an inherent relationship nor explicit information exists to facilitate synchronization.

BRIEF DESCRIPTION OF THE DRAWINGS

Reference will now be made to the accompanying drawings, which are not necessarily drawn to scale, and wherein.

DETAILED DESCRIPTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
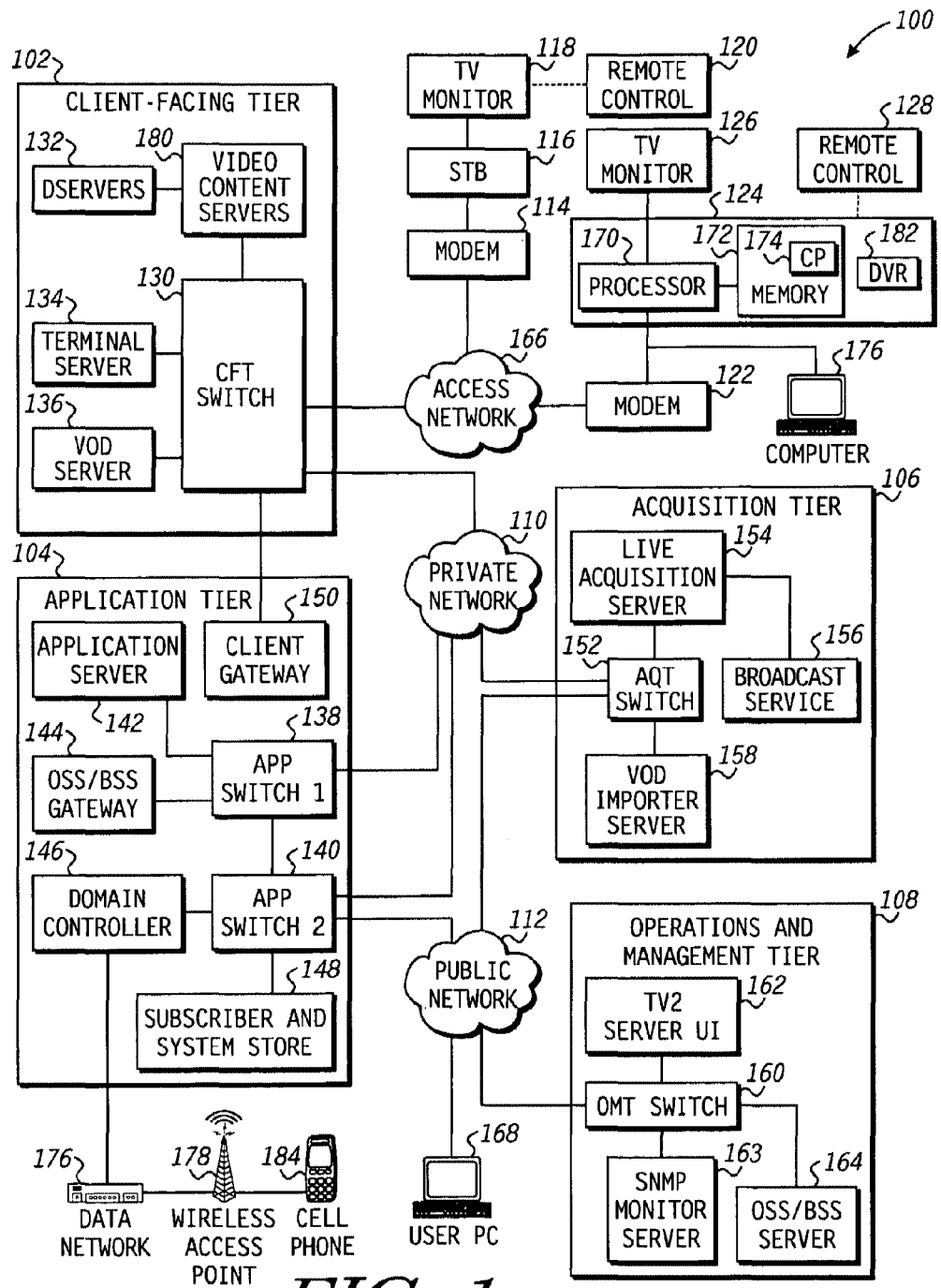
FIG. 1 illustrates a block diagram of a communication system including an Internet Protocol Television (IPTV) network.

FIG. 1 shows an exemplary communication system including multimedia processing devices that can synchronize audio and video streams as described herein. The communication system includes an IPTV system 100. The IPTV system 100 includes a client facing tier 102, an application tier 104, an acquisition tier 106, and an operations and management tier 108. Each tier 102, 104, 106, and 108 is connected to one or both of a private network 110 and a public network 112. For example, the client-facing tier 102 can be connected to the private network 110, while the application tier 104 can be connected to the private network 110 and to the public network 112, such as the Internet. The acquisition tier 106 can also be connected to the private network 110 and to the public network 112. Moreover, the operations and management tier 108 can be connected to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network, to access various sources illustrated at FIG. 1 or otherwise accessible via the private network 110 or the public network 112. In an illustrative embodiment, modems such as a first modem 114 and a second modem 122 can be connected to the private access network 166. The client-facing tier 102 can communicate with a first representative multimedia processing device, such as set-top box (STB) device 116 via the first modem 114 and with a second representative multimedia processing device, such as set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be connected to the modems 114 and 122 via fiber optic cables. Alternatively, the modems 114 and 122 can be digital subscriber line (DSL) modems that are connected to one or more network nodes via twisted pairs, and the client-facing tier 102 can be connected to the network nodes via fiber-optic cables. Each set-top box device 116 and 124 can process data received from the private access network 166 via an IPTV software platform such as Microsoft® TV IPTV Edition.

The first set-top box device 116 can be connected to a first display device 118, such as a first television monitor, and the second set-top box device 124 can be connected to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is connected. The set-top box devices 116 and 124 thus may include tuners that receive and decode television programming information for transmission to the display devices 118 and 126. Further, the set-top box devices 116 and 124 can include an STB processor 170 and an STB memory device 172 that is accessible to the STB processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is connected to one or more data servers 132 that store data transmitted in response to user requests, such as video-on-demand material. The CFT switch 130 can also be connected to a terminal server 134 that provides terminal devices, such as a game application server and other devices with a common connection point to the private network 110. In a particular embodiment, the CFT switch 130 can also be connected to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be connected to the second APP switch 140. The first APP switch 138 can be connected to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be connected to a domain controller 146 that provides web access to users via the public network 112. The second APP switch 140 can be connected to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be connected directly to the CFT switch 130. The client gateway 150 can provide user access to the private network 110 and the tiers connected thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be connected to a live acquisition server 154 that receives television content, for example, from a broadcast service 156. Further, the AQT switch can be connected to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is connected to a TV2 server 162. Additionally, the OMT switch 160 can be connected to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 connected to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alpha-numeric identifier of the second set-top box device, with any other data that is suitable for associating the second set-top box device with a user account, or with any combination of these.

The STB computer program 174 can contain instructions to receive many types of user preferences from the domain controller 146 via the access network 166. For example, the STB computer program 174 can include instructions to receive a request to record at least one television program at a video content storage module such as a digital video recorder (DVR) 182 within the second set-top box device 124. In this example embodiment, the STB computer program 174 can include instructions to transmit the request to the DVR 182, where the television program(s) are recorded. In an illustrative embodiment, the STB computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP).

In a particular embodiment, the synchronization techniques disclosed herein can be performed on a processing device, such as the computer 176, the user PC 168, the cell phone 184, the set-top box, and the like. For purposes of illustration, the description herein presumes the synchronization techniques are implemented at a set-top box.

Figure 2:
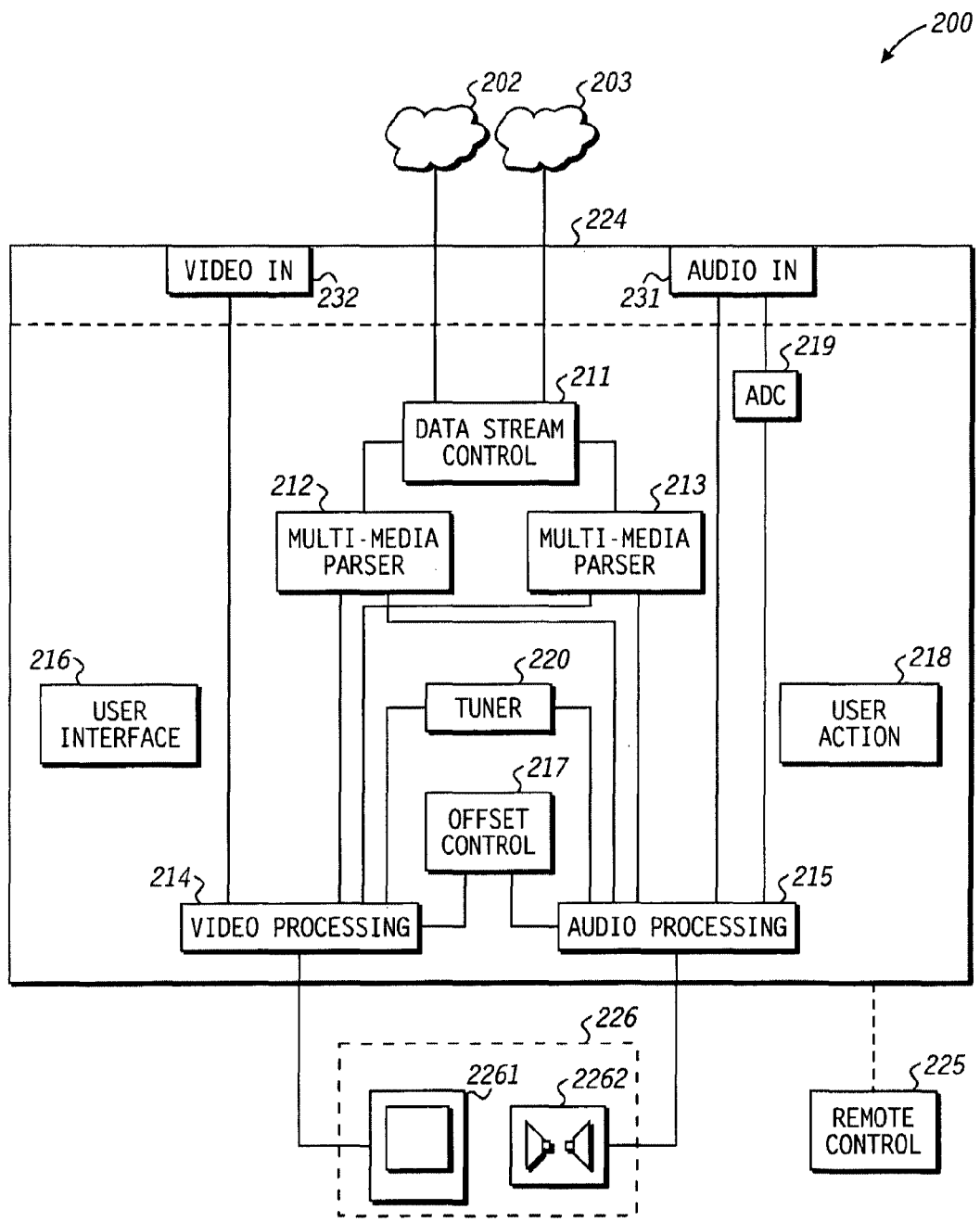
FIG. 2 is a specific implementation of a multimedia processing device of FIG. 1.

FIG. 2 illustrates a system 200 in accordance with a specific embodiment of the present disclosure. System 200 is illustrated to include a multimedia processing device 224, a multimedia center 226, and a remote control 225. The multimedia processing device 224 can represent a single device, such as a set top box, that can process various multimedia streams, audio streams, video streams, data streams, and combinations thereof. Alternatively, the multimedia processing device 224 can represent separate devices, such as a devices that processes a multimedia stream, devices that processes video-only streams, devices that processes audio-only streams, and the like.

The multimedia processing device 224 is connected to network 202, network 203, multimedia center 236, and remote control 228. Network 202 represents one or more private networks, such as network 166 of FIG. 1 having access limited to specific subscribers. Network 203 represents one or more other networks, which can include public networks, local networks, and the like. Note network access devices, such as modems 114 and 122 as described with reference to FIG. 1, that facilitate communication between multimedia processing device 224 and networks 202 and 203 are not specifically illustrated as part of system 200. It will be appreciated that when multimedia processing device 224 is only connected to a private network, e.g., network 202, information via can still be received via a public network. For example, as discussed with respect to FIG. 1, the multimedia processing device 224 can access information via the internet through the private network 166.

Multimedia center 226 includes a display device 2261 and audio playback device 2262, such as speakers, through which multimedia content can be experienced by a user. Examples of multimedia centers include televisions having integrated video and audio capabilities, and configurations having separate video and audio playback devices connected to receive content from a common multimedia processing device. For example, a multimedia center can include a video projector, or other display-only device, and a separate audio-only system connected to a common a set-top box that transmits both the audio and video signal. In this manner, a user would be able to experience a multimedia presentation including both audio and video content.

Multimedia processing device 224 is illustrated to include a data stream control module 211, a multimedia parser 212, a multimedia parser 213, a video processing module 214, an audio processing module 215, a user interface module 216, an offset control module 217, a user action control module 118, an analog-to-digital (AD) converter 219; a tuner 220, an audio-in port 231, and a video-in port 232.

The data stream control module 211 is connected to receive data streams from one or both of network 202 and network 203. A first multimedia stream received at the data stream control module 211 can be provided to multimedia parser 212 for processing. A second multimedia stream received at the data stream control module can be provided to multimedia parser 213 for processing. It will be appreciated that the multimedia parser 212 and multimedia parser 213 can be implemented at a common integrated circuit and share common devices. For example, the multimedia parser 212 and multimedia parser 213 can be part of an integrated design, whereby two or more multimedia streams are parsed by primarily the same hardware, as limited only by bandwidth. Alternatively, a video signal can be received at the data stream control module 211 or at the video-in port 232 from a video source (not illustrated), wherein the video-in port 232 represents one or more different video-in ports at multimedia processing device 224. For example, the video-in port 232 can include one or more analog or digital video-in ports. Analog video-in signals can be processed as analog signals by the video processing module 214, or they can be converted to digital signals at an analog-to-digital converter (not shown) for further processing. Similarly, an audio-only signal can be received at the data stream control module 211 or at the audio-in port 231 from an audio source (not illustrated), where the audio-in port represents one or more different audio-in ports at multimedia processing device 224. For example, the audio-in port 231 can include one or more analog or digital audio-in ports. Analog audio signals can be processed as analog signals by the audio processing module 215, or they can be converted to digital signals at an analog-to-digital converter, such as ADC 219, for further processing.

The video processing module 214 and the audio processing module 215 process audio and video streams, respectively, for real-time playback at multimedia center 226. It will be appreciated that multimedia processing multimedia processing device 224 can have other video and audio processing modules to simultaneously process other multimedia streams for real-time playback. Video processing module 214 can receive a video stream from multimedia parser 212, multimedia parser 213, tuner 220, or from the video-in port 232. Audio processing module 215 can receive an audio stream from multimedia parser 212, multimedia parser 213, tuner 220, or from the audio-in port 231.

An offset control module 217 is connected to video processing module 214 and to video processing module 215. A user interface module 216 communicates with various modules of the multimedia processing module 224, including the video processing module 214 to provide information to users of the multimedia processing device 224. The user action module 218 monitors various user actions of the multimedia processing device 224, such as actions performed at user controllable inputs of multimedia processing device or by remote control 225, and communicates received information to various other modules of multimedia processing device 224. Operation of multimedia processing device 224 will be better understood with reference to the discussions related to the methods illustrated at FIGS. 3-10.

Figure 3:
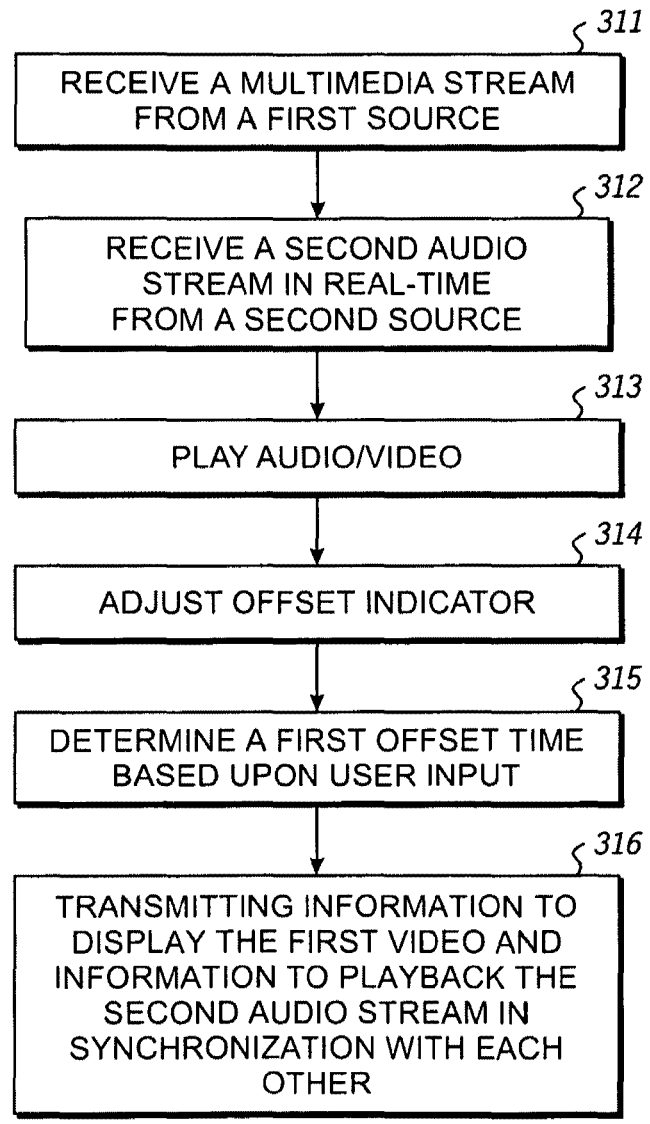
FIG. 3 is a flow chart of a method for synchronizing audio and video in accordance with a specific embodiment of the present disclosure.

FIG. 3 illustrates a flow diagram in accordance with a specific embodiment of a method of the present disclosure. At node 311 a multimedia stream is received from a first source, wherein the multimedia stream and the first source are specified by a user. For example, a user can manipulate the remote control 228, or physical controls at the multimedia processing module 224, to request a specific channel, such as a multimedia channel displaying a live football game, be received and processed for playback by the multimedia center 226. In response to the user request, the multimedia processing module 221 will request and receive the specific multimedia stream using an associated port, e.g., a port associated with tuner 220, a port associated data stream control module 211, or the audio-in and video-in ports 231 and 232. For purposes of discussion, it is presumed that the user requested multimedia stream is retrieved through the port associated with data stream control module 211 that communicate information via network 202. Note, as will be discussed in greater detail herein, only the video stream of the multimedia channel will be played back at multimedia center 226 when the multimedia processing device operates in a split mode of operation.

Referring to FIG. 2, a user request for a specific program can be received at the user action module 218, which in response will provide information related to the user request to the data stream control module 211. The data stream control module 211 will transmit a request over the network 202 for the multimedia stream associated with the user requested program. For example, a request based on the user's input can be provided to the client facing tier 102 of FIG. 1 by the multimedia processing device 224. In response, the client facing tier requests and receives the multimedia stream associated with the user's request from the acquisition tier 106. The acquisition tier 106 can request and receive the multimedia stream from one of several sources, such as a specific provider of a broadcast service, or from a video on demand server. The multimedia stream received at the client-facing tier 102 from the acquisition tier 106 is provided from switch 130 to the data stream control module 211.

It will be appreciated, that the requested multimedia content is generally received at the multimedia processing module 224 as a real time stream with respect to the manner its content is played back, and that the audio stream and the video steam of the multimedia stream can each include synchronization information, such as audio and video time stamps information, indicating when they are to be played back with respect to each other, e.g., when the content of a first picture corresponds to the content of an audio portion, thereby providing the ability to automatically synchronize the audio and video. The term real-time as used herein with respect to a multimedia stream, is intended to mean that the information associated with the multimedia stream is received intermittently during play back at substantially the same rate as it is intended to be consumed.

At node 312 an audio stream is received from a second source. For example, referring to FIG. 2, a user can manipulate the remote control 225, or physical controls at the multimedia processing module 224, to request a second specific channel having audio content to be received and processed for playback by the multimedia center 226. The second specific channel can be a radio broadcast, a different multimedia steam of the same live football game, or an audio-only stream received via network 202. In response to the request, the multimedia processing module 221 will receive the requested information using an associated port, e.g., a port associated with tuner 220, a port associated data stream control module 211, or the audio-in and video-in ports 231 and 232.

The source of the audio stream is different than the source of the multimedia stream received at node 311. For example, the multimedia stream received at node 311 can be a national network feed of a live football game received from a cable or satellite service provider, while the audio source can be an audio-only feed of the same live football game from a different content provider that is received over cable, satellite, a radio frequency transmission, the internet, and the like. For example, the audio source could be a radio frequency broadcast of the live football game over a local radio station affiliated with the football team, such as a university radio station that is affiliated with that university's football team, while the multimedia feed is associated with a national or international commercial content provider. Therefore, depending upon delivery methods supported by a content provider, the audio feed can be received at tuner 220, data stream controller 211, or at an audio-in port 231 for selection by audio processing module 215. It will therefore also be appreciated that both the multimedia stream received at node 311 and the audio stream of node 312 can be received at a common input port of the multimedia processing device 224, or at different input ports of the multimedia processing device 224. For example, the multimedia stream and the audio stream can both be received at a port that interfaces with network 202; the multimedia stream can be received at the port that interfaces to network 202 while the audio stream is received at a port that interfaces with of tuner 220, or that is received at audio-in port 231; the multimedia stream can be received at tuner 220, while the audio stream is received at one of network 202, or audio-in port 231; or the multimedia stream can be received at ports of the audio-in and video-in modules 231 and 232, while the audio stream is received at one of network 202, or tuner 220.

At node 313, audio/video is played back at the multimedia center 226. During normal operation in response to the multimedia stream being received at node 311 the video stream of the user selected multimedia stream will be processed and displayed at display device 2261 of the multimedia center 226 by video processing module 214, while the audio stream of the multimedia stream received at node 311 is processed by audio processing module 215 for playback at the speakers 2262 of the multimedia center 226. However, when a split mode of operation is selected by the user, the multimedia processing device 224 will process audio and video streams from different sources for simultaneous playback at multimedia center 226. For example, in response to the user selecting a split source mode of operation, which can be a user selectable option using setup options of the multimedia processing device 224, the video stream from one source, such as the source described at node 311, and the audio stream from another source, such as the source described at node 312, are played back simultaneously as a common multimedia event at the multimedia center 226.

When the multimedia processing device 224 is configured in the split mode of operation supporting multimedia playback from different audio and video sources, a mismatch in synchronization between viewed video and heard audio can occur. This synchronization mismatch can be the result of intentional and inherent factors. For example, the processing needed to transmit a video feed of a live football game over network 202 can take longer than an audio feed of the live football game. Similarly, the processing needed at video processing module 214 to process a received a video feed of a live football game can take longer than an audio feed of the live football game. In addition, intentional delay can be introduced into one or both of the audio and video streams that can result in a delay between the audio and video playback at multimedia center 226.

Note that while transmitted multimedia information can include synchronization information to synchronize its corresponding audio and video streams, this synchronization information is not applicable between audio and video streams from a different source. Therefore, when audio and video streams from different sources are selected, a portion of the audio feed having content corresponding to content of a specific picture of the video feed could be heard prior to, or subsequent to, the content of the picture having the same content would be seen.

At node 314, when the multimedia processing device 224 is configured in the split mode of operation, the user performs an action to set adjust an offset indicator used to set an offset time that is introduced by the multimedia processing device 224 between when the audio processing module 215 can transmit audio information to the speakers 2262 for playback and when the video processing module 214 can transmit video information to the display device 2261 for display. By adjusting the offset indicator, the intentional and inherent delay between the audio stream and video stream is compensated for when the offset time inversely matches the combined intentional and inherent delay between when video content is transmitted from multimedia processing device 224 for display relative to when audio content is transmitted from multimedia processing device 224 for playback. FIGS. 4-8 illustrate various devices and methods through which the offset delay can be adjusted by a user.

Figure 4:
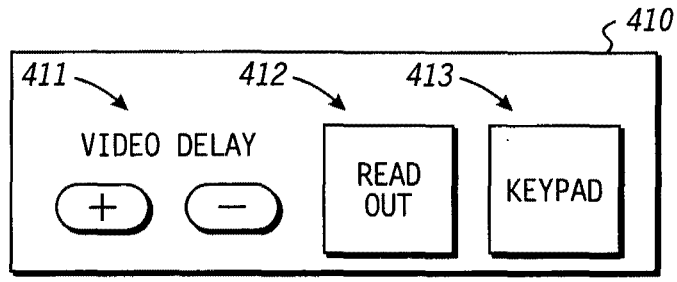
FIGS. 4-7 illustrate various multimedia processing devices in accordance with specific embodiments of the present disclosure.

FIG. 4 illustrates a specific embodiment of physical user controls at multimedia processing device 410 that can be used by a user to adjust a video offset time. An offset indicator corresponding to an offset time by which the video image is to be delayed, relative to when the video image could first be displayed, is changed by user manipulation of the physical user controls 411. For example, pressing the increase control, e.g., the button labeled "+", increases the amount that the video stream is to be delayed. Similarly, pressing the decrement control, e.g., the button labeled "−", decreases the amount that the video stream is delayed. The offset indicator can be displayed at the readout 412. Alternatively, a value of the offset indicator can be entered at the keypad 413. The offset indicator can be a numerical value, or non-numeric graphical indicator.

Figure 5:
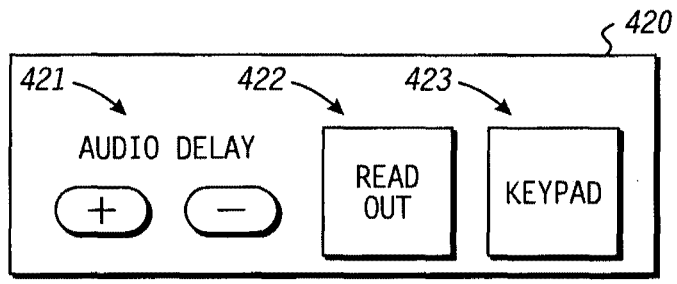

FIG. 5 illustrates a specific embodiment of physical user controls at multimedia processing device 420 that can be used by a user to adjust an audio offset time. An offset indicator representative of an offset time by which the audio image is to be delayed, relative to when the audio could first be played, is changed by user manipulation of the user controls 421. For example, pressing the increase control, e.g., the button labeled "+", increases the amount that the audio stream is to be delayed. Similarly, pressing the decrement control, e.g., the button labeled "−", decreases the amount that the audio stream is delayed. The offset indicator can be displayed at the readout 422. Alternatively, a value of the offset indicator can be entered at the keypad 423. The offset indicator can be a numerical value, or non-numeric graphical indicator.

Figure 6:
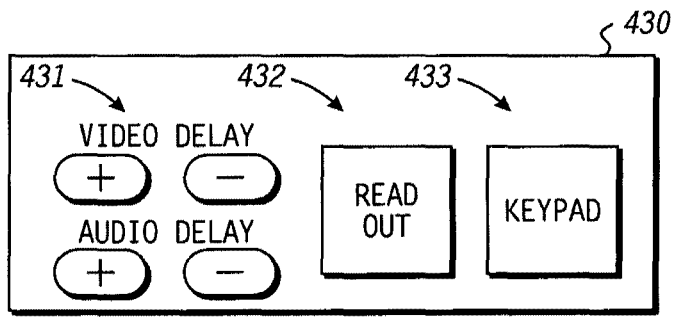

FIG. 6 illustrates a specific embodiment of physical user controls at multimedia processing device 430 that can be used by a user to adjust a video offset time and an audio offset time. An offset indicator representative of a video offset time by which the video image is to be delayed, relative to when the video could first be displayed, is changed by user manipulation of the user controls 431. For example, pressing the top increase control, e.g., the button labeled "+", increases the amount that the video stream is to be delayed. Similarly, pressing the bottom decrement control, e.g., the button labeled "−", decreases the amount that the video stream is delayed. An offset indicator representative of an offset time by which the audio image is to be delayed, relative to when the audio could first be played, is also changed by user manipulation of the user controls 431. Therefore, pressing the increase control, e.g., the bottom button labeled "+", increases the amount that the audio stream is to be delayed. Similarly, pressing the bottom decrement control, e.g., the button labeled "−", decreases the amount that the audio stream is delayed. The offset indicators can be displayed at the readout 432. Alternatively, values of the offset indicator can be entered at the keypad 433. The offset indicator can be a numerical value, or non-numeric graphical indicator.

Figure 7:
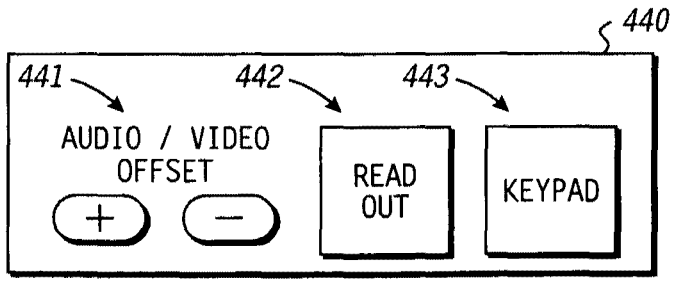

FIG. 7 illustrates a specific embodiment of physical user controls at multimedia processing device 440 that can be used by a user to adjust a relative offset time between transmitted audio information and transmitted video information. For example, an offset indicator corresponding to a positive offset time indicates an amount that transmission of audio information to the speakers 2262 is to be delayed relative to when it was available for playback, while a negative offset time indicates an amount that transmission of video information to the display device 2261 is to be delayed relative to when it was available for playback Therefore, pressing the increase control, e.g., the button labeled "+", increases the amount of delay introduced to the audio stream relative to the video stream. Similarly, pressing the decrement control, e.g., the button labeled "−", increases the amount of delay introduced to the video stream relative to the audio stream. Alternatively, a value of the offset indicator can be entered at the keypad 443, and displayed at the read out 442. The offset indicator can be a numerical value, or non-numeric graphical indicator.

Figure 8:
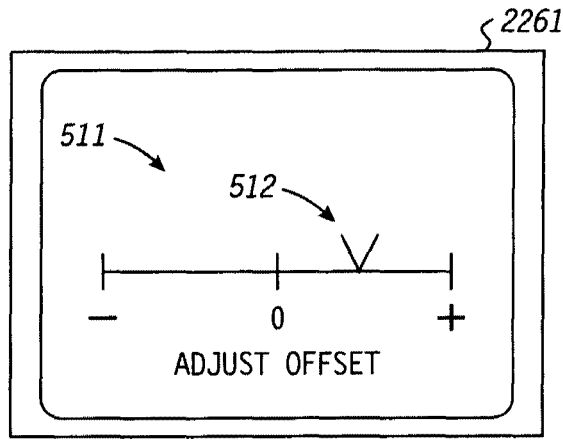
FIG. 8 illustrates an on-screen indicator representing an offset value in accordance with a specific embodiment of the present disclosure.

FIG. 8 illustrates an indicator 512 representing an offset indicator being displayed at the display device 2261. Specifically, FIG. 8 illustrates indicator 512 being displayed along a continuum represented by line 511. When the indicator 512 is to the right of the value marked "0", the audio is to be delayed. When the indicator 512 is to the left of the value marked "0", the video is to be delayed. The image information representing the indicator 512 and the line 511 is generated by user interface module 215 of multimedia processing device 224 and provided to the video processing module 214 for overlay over the currently displayed content. The indicator 512 can be controlled by a physical user control at the multimedia processing device 224, or by use of remote control 225.

Figure 9:
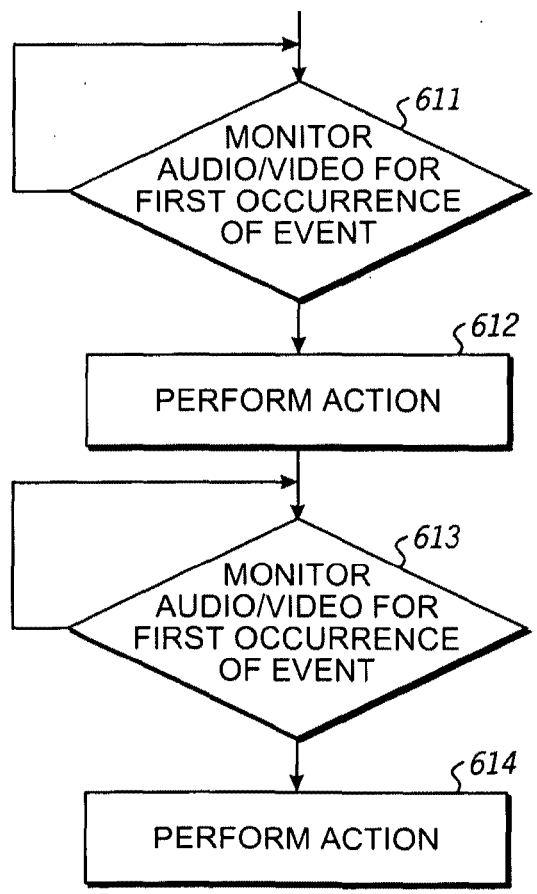
FIG. 9 illustrates a flow diagram of a method of setting an offset value in accordance with a specific embodiment of the present disclosure.

FIG. 9 illustrates a flow diagram representing an alternative method of providing an offset indicator used to determine the offset time. At node 611, a user monitors the video and audio content from multimedia center 226 for a common event, e.g., common content. For example, during a football game, a user can monitor the audio/video for a kick-off, which can be readily viewed and heard by the user. When the kickoff is viewed, flow proceeds to node 612, where the user performs an action to indicate viewing the desired event, e.g., the kick-off. For example, the user can press a button at the multimedia processing device or at a remote control to communicate with the multimedia processing device 224. At node 613, the user continues to monitor the audio/video playback at multimedia center 226 to determine when the corresponding event is heard, e.g., when the user hears the ball being kicked. When the desired event is heard by the user, flow proceeds to node 614 where the user performs an action to indicate hearing the event. For example, the user can press a button at the multimedia processing device or at a remote control that communicates with the multimedia processing device. Note that the button pressed can be the same button for both the audio and video event, or there can be dedicated buttons, one for audio and one for video. The information provided from the user at nodes 612 and 614 can be used to determine an offset time as indicated at node 315 of FIG. 2.

At node 316, video information is transmitted from the multimedia processing device 224 to display the content of the received video steam at the display device 2261 and audio information is transmitted from the processing device 224 to playback the content of the audio stream at the speakers 2262 in synchronization with each other. For example, when the audio steam precedes the video stream, with respect to when a portion of the audio stream having content is available for playback relative when a picture of the video stream having representing the same content is available for display, the audio stream, or the playback information, is buffered based upon offset information received by the offset control module 217, and its transmission delayed relative to when it was first available for transmission. Alternatively, when the video stream precedes the video stream, the video stream is buffered based upon offset information received by the offset control module 217 and its transmission delayed relative to when it was first available for transmission. In this manner, audio and video streams from different sources can be synchronized for playback at a multimedia center.

In addition to transmitting the synchronized signals to the display device 2261 for display, the synchronized audio/video information from the audio/video processing modules 215 and 214 can be stored for later playback. For example, the audio/video information could be stored at DVR 182 (FIG. 1).

Figure 10:
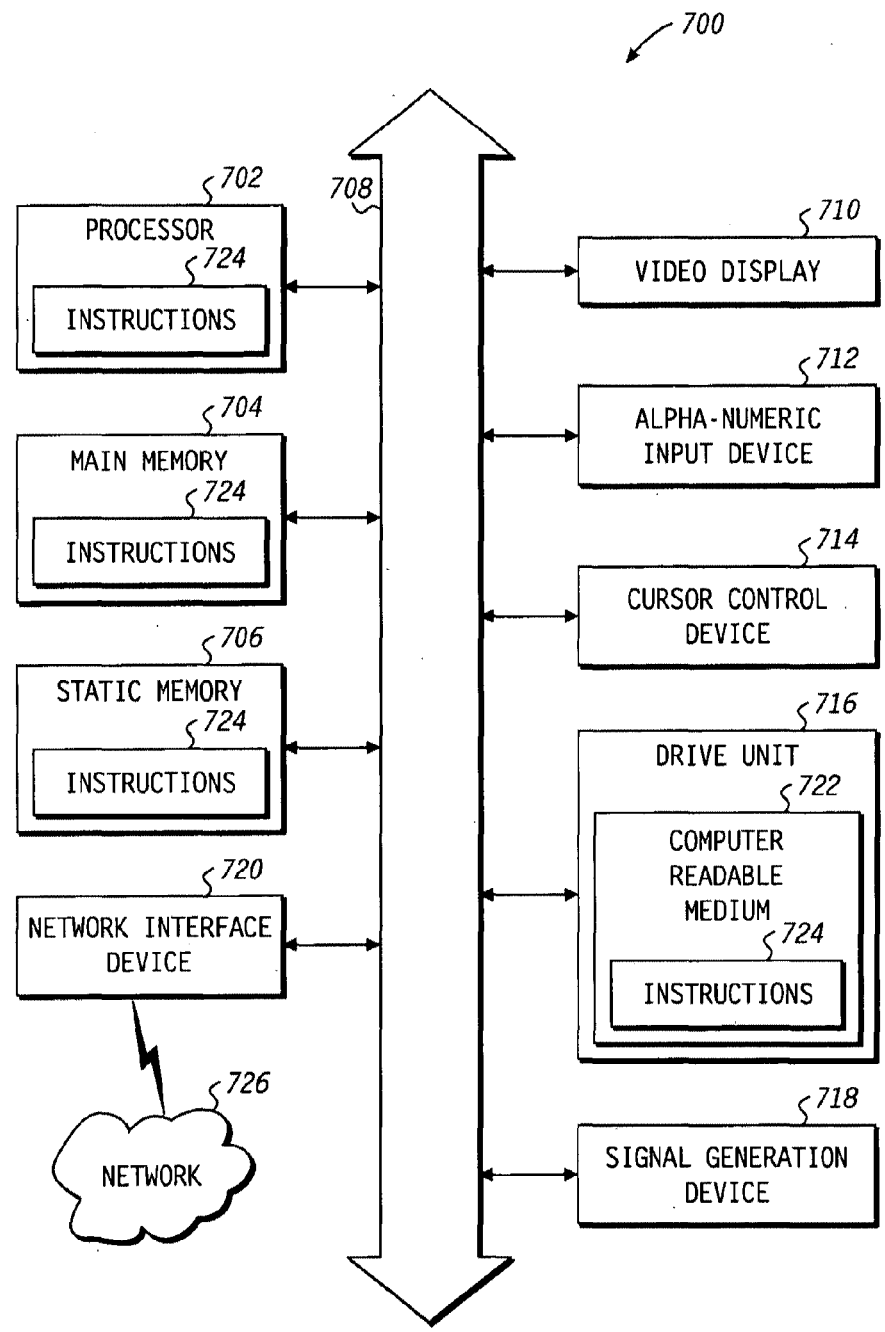
FIG. 10 illustrates a block diagram of a general computer system.

FIG. 10 shows an illustrative embodiment of a general computer system 700 in accordance with at least one embodiment of the present disclosure. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set or multiple sets, of instructions to perform one or more computer functions.

The computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 10, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724, or receives and executes instructions 724, responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Fore example, it will be appreciated that that depending upon the type of network, the data stream control module 211 may not need to transmit a request over network 202 to receive a requested channel, but instead will monitor data received at the multimedia processing device and process the desired channel as it is received. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. .sctn.1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
receiving, by a multimedia processing device comprising a processor, a first action at a first time during a presentation of video content of a multimedia stream comprising a first video stream, and audio content of a second audio stream, wherein the first action is coincident with a visual aspect of an event observable in the presentation of the video content, wherein the first video stream originates from a first source and the second audio stream originates from a second source, wherein the first video stream and the second audio stream are associated with common subject matter, wherein the event is common to the subject matter presented in both the first video stream and the second audio stream;
receiving, by the multimedia processing device, at a second time during presentation of the audio content, a second action coincident with an audible aspect of the event observable in a presentation of the second audio stream, wherein one of the first action, the second action, or the first and second actions comprises performing an action;

determining, by the multimedia processing device, in real-time, a timing offset between the first video stream and the second audio stream according to a time difference between the first time and the second time;

transmitting, by the multimedia processing device, first information to display images associated with the first video stream; and transmitting, by the multimedia processing device, second information while receiving the second audio stream to present audible signals associated with the second audio stream, wherein transmitting of the first information and the second information is synchronized according to the timing offset.

2. The method of claim 1, wherein the first information to display the images associated with the first video stream is delayed according to the timing offset.

3. The method of claim 1, wherein the second information to present the audible signals associated with the second audio stream is delayed according to the timing offset.

4. The method of claim 1, wherein performing of the action comprises pressing a button at the multimedia processing device.

5. The method of claim 1, wherein determining the timing offset is determined in response to control of a physical input of the multimedia processing device that delays the second audio stream.

6. The method of claim 5, wherein the timing offset is determined in response to control of the physical input of the multimedia processing device that delays the first video stream.

7. The method of claim 1, wherein determining the timing offset is determined in response to control of a physical input of the multimedia processing device that delays the first video stream.

8. The method of claim 1, further comprising:
receiving, by the multimedia processing device, the multimedia stream via a private network; and
receiving, by the multimedia processing device, the second audio stream via a public network source.

9. The method of claim 1, further comprising:
receiving, by the multimedia processing device, the multimedia stream at a first input port of the multimedia processing device; and
receiving, by the multimedia processing device, the second audio stream is received at a second input port of the multimedia processing device.

10. The method of claim 1, wherein one of the first action, the second action, or the first and second actions comprises pressing a button at a remote control in communication with the multimedia processing device.

11. The method of claim 1, further comprising saving, by the multimedia processing device, the first video stream and the second audio stream for retransmission according to the timing offset.

12. A machine-readable storage device, comprising executable instructions that, when executed by a processor, facilitate performance of operations, comprising:
selecting a first multimedia stream including a first video stream and a first audio stream;
selecting a second audio stream, wherein the first multimedia stream and the second audio stream are associated with common subject matter;
selecting playback of the first video stream and the second audio stream at a multimedia center;
determining a timing offset according to a time difference between a first input coincident with a visual aspect of an event observable in the playback of the first video stream and a second input coincident with an audible aspect of the event observable in the playback of the second audio stream, wherein one of the first input, the second input, or the first and second inputs comprises performing an action during playback of the first video stream and the second audio stream at the multimedia center; and
synchronizing the first video stream and the second audio stream according to the timing offset.

13. The machine-readable storage device of claim 12, wherein determining the timing offset comprises adjusting an indicator at a display device according to the input.

14. The machine-readable storage device of claim 12, wherein determining the timing offset comprises manipulating a physical input of a device that processes the second audio stream to establish the timing offset.

15. The machine-readable storage device of claim 12, wherein selecting the second audio stream includes selecting a second multimedia stream including the second audio stream.

16. The machine-readable storage device of claim 12, wherein determining the timing offset comprises receiving the input during playback of the first video stream and the second audio stream responsive to the event included in the first video stream.

17. A device comprising:
a controller; and
a memory that stores executable instructions that, when executed by the controller facilitates performance of operations, comprising:
receiving, at a first time, a first action at equipment of a user coincident with a visual aspect of an event observable in video content of a multimedia stream comprising a video stream and a first audio stream, wherein the first time is during a presentation of the video content at a multimedia system, and wherein the event is common to subject matter presented in both the multimedia stream and audio content of a second audio stream;
receiving, at a second time, a second action at the equipment of the user coincident with an audible aspect of the event observable in the second audio stream, wherein the second time is during a presentation of the audio content at the multimedia system, and wherein one of the first action, the second action, or the first and second actions comprises performing an action;
determining in real-time a timing offset between the video stream and the second audio stream according to a time difference between the first time and the second time; and
synchronizing image information of the video stream with audio information of the second audio stream according to the timing offset to generate synchronized image information and synchronized audio information, wherein the synchronized image information and the synchronized audio information are suitable for concurrent synchronized presentation at the equipment of the user.

18. The device of claim 17, wherein the synchronizing of the image information of the video stream with the audio information of the second audio stream comprises delaying the presentation of the video content of the video stream according to the timing offset.

19. The device of claim 17, wherein synchronizing of the image information of the video stream with the audio information of the second audio stream comprises delaying presentation of the audio content of the second audio stream according to the timing offset.

20. The device of claim 17, wherein performing of the action comprises pressing a button.

* * * * *